United States Patent
Inagaki et al.

(10) Patent No.: US 8,187,750 B2
(45) Date of Patent: May 29, 2012

(54) NEGATIVE ACTIVE MATERIAL INCLUDING LITHIUM VANADIUM OXIDE FOR NON-AQUEOUS RECHARGEABLE BATTERY, AND NON-AQUEOUS RECHARGEABLE BATTERY INCLUDING SAME

(75) Inventors: Toru Inagaki, Yokohama (JP); Masaki Koike, Yokohama (JP); Sung-Soo Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1201 days.

(21) Appl. No.: 11/902,206

(22) Filed: Sep. 19, 2007

(65) Prior Publication Data

US 2008/0070118 A1    Mar. 20, 2008

(30) Foreign Application Priority Data

Sep. 19, 2006  (JP) .................................. 2006-252225
Sep. 17, 2007  (KR) ......................... 10-2007-0094178

(51) Int. Cl.
*H01M 4/13*     (2010.01)
(52) U.S. Cl. ............... 429/231.2; 429/231.5; 429/231.9; 429/218.1
(58) Field of Classification Search ............ 429/231.5, 429/231.9, 218.1, 231.2
See application file for complete search history.

(56) References Cited

U.S. PATENT DOCUMENTS

| | | |
|---|---|---|
| 4,029,132 A | 6/1977 | Jackovitz et al. |
| 2004/0048157 A1 | 3/2004 | Neudecker et al. |

FOREIGN PATENT DOCUMENTS

| | | |
|---|---|---|
| CN | 1783551 | 6/2006 |
| JP | 04-363862 | 12/1992 |
| JP | 06-302320 A | 10/1994 |
| JP | 07-029604 A | 1/1995 |
| JP | 2819201 | 10/1998 |
| JP | 2819201 B * | 10/1998 |
| JP | 2000-017382 | 1/2000 |
| JP | 2002-260660 A | 9/2002 |
| JP | 2003-068305 | 3/2003 |
| JP | 2003068305 A * | 3/2003 |
| JP | 2003-123749 A | 4/2003 |

(Continued)

OTHER PUBLICATIONS

Notice of Allowance dated May 31, 2010 issued by Korean Patent Office corresponding to Korean Patent Application No. 10-2007-0094178 and Request for Entry of the Accompanying Office Action attached herewith.

(Continued)

*Primary Examiner* — Barbara Gilliam
*Assistant Examiner* — Zachary Best
(74) *Attorney, Agent, or Firm* — Robert E. Bushnell, Esq.

(57) ABSTRACT

The negative active material for a non-aqueous rechargeable battery includes a main component of lithium vanadium oxide, and at least one selected from the group consisting of $Li_3VO_4$, vanadium carbide, and mixtures thereof. The $Li_3VO_4$ is included in an amount of 0.5 to 3.0 wt % based on the total weight of the negative active material, and the vanadium carbide is included in amount of 0.5 wt % or less based on the total weight of the negative active material. The negative active material can improve discharge capacity of the non-aqueous rechargeable battery.

6 Claims, 3 Drawing Sheets

FOREIGN PATENT DOCUMENTS

| | | |
|---|---|---|
| JP | 2004-010445 A | 1/2004 |
| JP | 2005-158604 A | 6/2005 |
| JP | 2005-158725   | 6/2005 |
| JP | 2005-158725 A | 6/2005 |
| KR | 1020000017382 A | 3/2000 |

OTHER PUBLICATIONS

Japanese Office action issued by JPO on Jan. 10, 2012, corresponding to JP2006-252225 and request for Entry attached herewith.

* cited by examiner

NEGATIVE ACTIVE MATERIAL INCLUDING LITHIUM VANADIUM OXIDE FOR NON-AQUEOUS RECHARGEABLE BATTERY, AND NON-AQUEOUS RECHARGEABLE BATTERY INCLUDING SAME

CLAIM OF PRIORITY

This application claims priorities to and the benefits of Japanese Patent Application No. 2006-252225 filed in the Japanese Intellectual Property Office on 19 Sep. 2006, and Korean Patent Application No. 2007-0094178 filed in the Korean Intellectual Property Office on the 17 Sep. 2007, the entire contents of which are incorporated herein by reference.

BACKGROUND OF THE INVENTION

1. Field of the Invention

The present invention relates to a negative active material for a non-aqueous rechargeable battery and a non-aqueous rechargeable battery including the same. More particularly, the present invention relates to a negative active material for a non-aqueous rechargeable battery with improved-discharge capacity, and a non-aqueous rechargeable battery including the same.

2. Description of the Related Art

A conventional non-aqueous rechargeable battery includes a positive electrode and a negative electrode being capable of intercalating and deintercalating lithium ions impregnated in a non-aqueous electrolyte (Japanese Patent laid-open No. 2003-68305, pages 3-11, FIG. 10). The negative active material includes lithium vanadium oxide. The lithium vanadium oxide is prepared by mixing a lithium source, such as lithium hydroxide and the like, and a vanadium source, such as vanadium trioxide and the like, in a solid-phase method and firing the mixture at 650° C. or higher.

When a non-aqueous rechargeable battery is charged, and its negative electrode is electrified to be negative, lithium ions intercalated into the positive electrode are deintercalated and then intercalated into the negative electrode.

When a non-aqueous rechargeable battery is discharged, the lithium ions intercalated into the negative electrode are deintercalated and then intercalated into the positive electrode.

Accordingly, the non-aqueous rechargeable battery can have a long cycle-life by preventing precipitation of a lithium metal from the negative electrode.

In general, a non-aqueous rechargeable battery is widely used for portable electronic devices, such as a personal computer, a mobile phone, and the like. The electronic device needs a long operation time from full-charge despite huge consumption of electric power. Accordingly, a non-aqueous rechargeable battery with larger discharge capacity is required.

SUMMARY OF THE INVENTION

One embodiment of the present invention provides a negative active material for a non-aqueous rechargeable battery being capable of improving discharge capacity of the battery.

Another embodiment of the present invention provides a non-aqueous rechargeable battery including the negative active material, and thus showing excellent discharge capacity characteristics.

According to an embodiment of the present invention, provided is a negative active material for a non-aqueous rechargeable battery that includes a main component of lithium vanadium oxide, and at least one selected from the group consisting of $Li_3VO_4$, vanadium carbide, and mixtures thereof. The $Li_3VO_4$ is included in an amount of 0.01 to 5 wt % based on the total weight of the negative active material, and the vanadium carbide is included in an amount of 0.5 wt % or less of the total weight of the negative active material.

The negative active material can be prepared by adding at least one selected from the group consisting of $Li_3VO_4$, vanadium carbide, and mixtures thereof to a mixture of a lithium source material and a vanadium source material, and then subjecting the resulting mixture to firing under an inert atmosphere, such as nitrogen, argon, and so on.

The negative active material may include vanadium carbide in an amount of 0.5 wt % or less.

The negative active material for a non-aqueous rechargeable battery has an average particle diameter ranging from 5 to 50 μm.

According to another embodiment of the present invention, provided is a negative active material for a non-aqueous rechargeable battery that includes a main component of lithium vanadium oxide and vanadium carbide in an amount of 0.5 wt % or less.

According to a further embodiment of the present invention, provided is a non-aqueous rechargeable battery that includes a negative electrode including the negative active material, a positive electrode, and an electrolyte.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
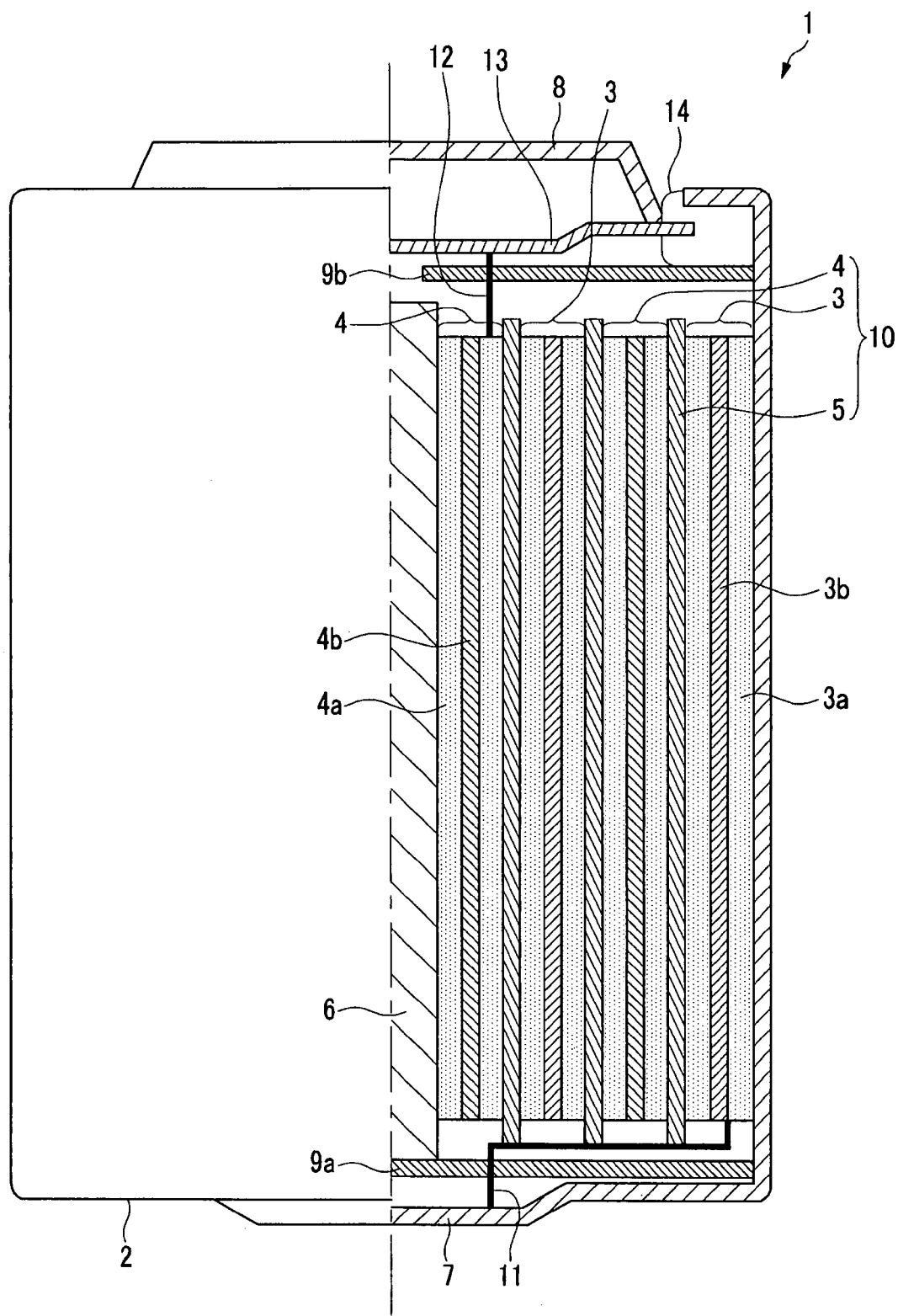
FIG. 1 is a vertical cross-sectional view of a non-aqueous rechargeable battery according to one embodiment of the present invention.

FIG. 1 is a vertical cross-sectional view of a non-aqueous rechargeable battery according to one embodiment of the present invention.

Referring to FIG. 1, a non-aqueous rechargeable battery 1 according to one embodiment of the present invention is fabricated as a spiral cylindrical lithium rechargeable battery. The non-aqueous rechargeable battery 1 includes a center pin 6 and an electrode assembly 10 wound around the center pin 6. Herein, the electrode assembly 10 includes a positive electrode 3 and a negative electrode 4, and a separator 5 inserted therebetween. Accordingly, the electrode assembly 10 has a cylindrical structure.

The positive electrode 3 is formed by disposing a positive electrode active mass 3a including a positive active material on both surfaces of a positive electrode current collector 3b. The negative electrode 4 is formed by disposing a negative active mass 4a including a negative active material on both surfaces of a negative electrode current collector 4b. The cylindrical electrode assembly 10 is housed in a cylindrical case 2 with a hollow space and impregnated with an electrolyte (not shown). The positive electrode 3 contacts with the case 2 and also has a positive terminal 7 protruded at the bottom.

The electrode assembly 10 is mounted with insulating plates 9b and 9a at the top and bottom. The positive electrode current collector 3b passes through the insulating plate 9a and contacts with the positive terminal 7 by a positive electrode lead 11. A safety plate 13 is mounted above the insulating plate 9b located at the opening of the case 2 in the same direction as the insulating plate 9b. A negative terminal 8 shaped as a convex cap in the opposite direction to the safety plate 13, is mounted on the safety plate 13. The negative electrode current collector 4b passes through the insulating plate 9b and contacts with the negative terminal 8 by a negative electrode lead 12. In addition, the safety plate 13 and the edge of the negative terminal 8 are sealed by a gasket 14, which separates them from the positive terminal 7.

The positive active material and the electrolyte may include a common positive electrode and electrolyte for a non-aqueous rechargeable battery. For example, the positive active material may include a lithium transition element oxide such as lithium cobalt oxide and the like. In addition, the electrolyte may include a solute including a lithium salt consisting of $LiPF_6$, $Li_2SiF_6$, $Li_2TiF_6$, $LiBF_4$, and the like in a solvent such as ethylene carbonate, diethyl carbonate, or the like.

The negative electrode 4 includes a negative active material including a lithium vanadium oxide as a main component. It is formed by mixing 80 wt % of the negative active material, 10 wt % of acetylene black, 10 wt % of a binder, coating the mixture on, a copper current collector, and pressing the coating to have a mass density of 1.8 g/cm$^3$.

According to one embodiment of the present invention, the negative active material may be selected from the group consisting of $Li_3VO_4$, vanadium carbide (VC), and mixtures thereof, which are commonly considered as impurities.

The $Li_3VO_4$ has a lower melting point of about 600° C. than lithium vanadium oxide ($LiVO_2$) as a main component. Accordingly, when a negative active material is prepared through firing, the firing can promote combination of $LiVO_2$ particles as a main component. In addition, as the $Li_3VO_4$ is increasingly included, a negative active material may have a bigger average particle diameter.

The $Li_3VO_4$ may be included in an amount of 0.01 to 5 wt % based on the total weight of the negative active material. According to one embodiment of the present invention, it may be included in an amount of 0.5 to 3 wt %, while according to another embodiment of the present invention, it may be included in an amount of 1 to 2 wt %. When it is included out of the above range, it may deteriorate discharge capacity.

In addition, the negative active material including $Li_3VO_4$ may have an average particle diameter ranging from 5 μm to 50 μm. In one embodiment, it may have an average particle diameter ranging from 10 μm to 50 μm, and in another embodiment, it may have an average particle diameter ranging from 10 μm to 40 μm.

When a negative active material with a smaller average particle diameter than the above range is mixed with a conductive agent, it may have less possibility of contacting with the conductive agent.

In addition, when a negative active material is prepared to increasingly include $Li_3VO_4$, it may have a bigger average particle diameter but deteriorate discharge capacity. The $Li_3VO_4$ is considered as an impurity in the negative active material.

On the other hand, when a negative active material includes VC, which is a good conductive agent with a volume resistance rate of 150×10−6 Ω·cm, it may have increased conductivity inside a particle. For example, the negative active material can resist against a high efficiency discharge of 3 mA/cm$^2$. However, VC can excessively take vanadium from a lithium vanadium oxide playing a role of intercalating lithium, and thereby deteriorate discharge capacity. Accordingly, VC may be included in an amount of 0.5 wt % or less based on the total weight of the negative active material. In one embodiment, it may be included in an amount of 0.01 to 0.4 wt % according to another embodiment of the present invention. When a negative active material includes VC out of the above range, it may have deteriorated discharge capacity.

On the other hand, a negative active material with the aforementioned composition can be prepared by preparing a mixture of a lithium source material and a vanadium source material, adding a material selected from the group consisting of $Li_3VO_4$, vanadium carbide, and mixtures thereof thereto, and firing the resulting product under an inert atmosphere such as nitrogen, argon, and the like.

Also, a negative active material including $Li_3VO_4$ as an impurity can be prepared by using lithium in an excess of amount to the vanadium. Therefore, without adding $Li_3VO_4$, a negative active material including $Li_3VO_4$ can be prepared by preparing a mixture of a lithium source material and a vanadium source material in amounts having a mole ratio of Li:V=1.13:0.9 or more. In one embodiment, concerning the amount of $Li_3VO_4$ included in the negative active material, the mole ratio of Li:V may be from 1.13:0.9 to 1.21:0.9.

A negative active material including VC as an impurity also can be prepared by using vanadium in an excess of amount to the lithium. Therefore, without adding VC, a negative active material including VC can be prepared by preparing a mixture of a lithium source material and a vanadium source material in amounts having a mole ratio of Li:V=more than 1.08:0.9 or less than 1.13:0.9, concerning the amount of $Li_3VO_4$ included in the negative active material.

The lithium source material may include lithium hydroxide and the like, and the vanadium source material may include vanadium oxide such as $V_2O_3$.

The lithium source material and vanadium source material can be mixed in various ratios considering the amount of lithium and vanadium included in a negative active material as a final material.

Then, a material selected from the group consisting of $Li_3VO_4$, vanadium carbide, and a mixture thereof is added to the above mixture in the same ratio as aforementioned. The resulting mixture is fired under an inert atmosphere.

The firing can be performed at a temperature of from approximately 1100° C. to 1200° C.

The following examples illustrate the present invention in more detail. However, it is understood that the present invention is not limited by these examples.

Example 1

Figure 2A:
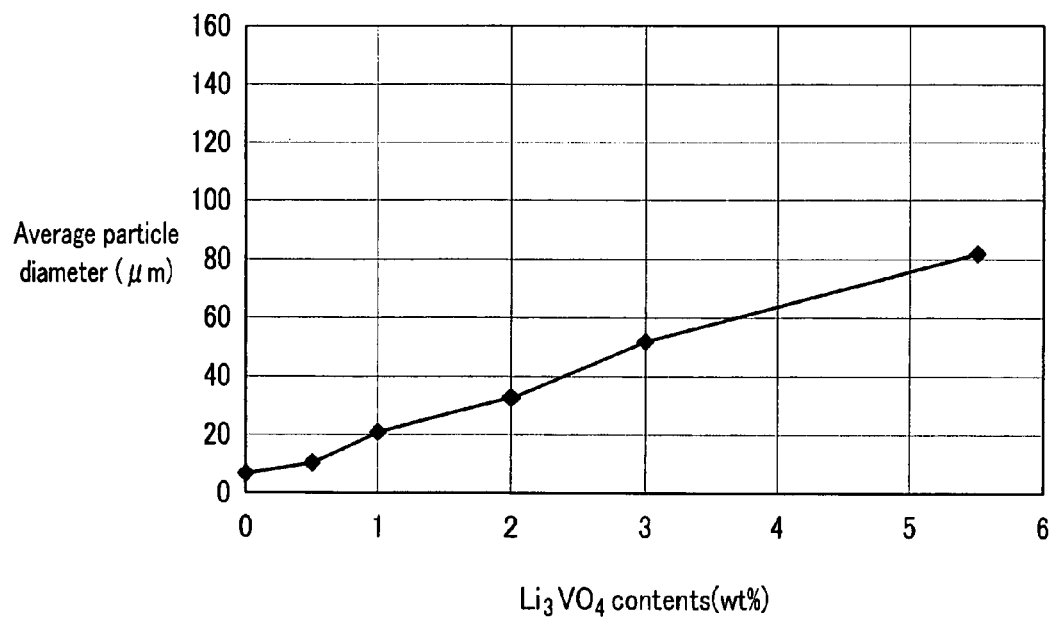
FIG. 2A is a graph showing the relationship between $Li_3VO_4$ content and average particle diameter of the negative active material in the negative active mass for a non-aqueous rechargeable battery according to Example 1.
Figure 2B:
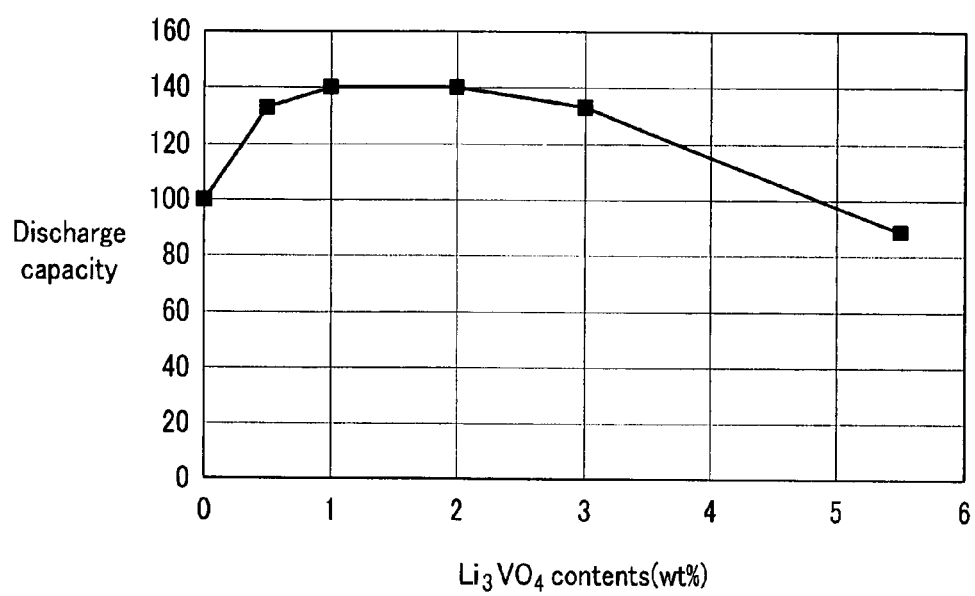
FIG. 2B is a graph showing the relationship between $Li_3VO_4$ content of the negative active material in the negative active mass for a non-aqueous rechargeable battery according to Example 1 and discharge capacity.

A negative active material was prepared in the following method, and then measured regarding discharge capacity and average particle diameter depending on the content of $Li_3VO_4$ therein to evaluate the relationship of the content of $Li_3VO_4$ to discharge capacity and average particle diameter thereof. The results are shown in FIGS. 2A and 2B.

Preparation of a Negative Active Material

LiOH (lithium hydroxide) and $V_2O_3$ (vanadium trioxide) were mixed in a mole ratio of 1.22:1 between lithium and vanadium, and $Li_3VO_4$ was respectively added thereto in an amount of 0 wt %, 1 wt %, 2 wt %, 3 wt %, and 5.5 wt %. The resulting product was fired at 1100° C. under a nitrogen atmosphere to prepare a negative active material including $LiVO_2$ as a main component and $Li_3VO_4$.

1-2) Evaluation

The negative active material according to Example 1 was measured regarding average particle diameter. Then, an X-ray diffraction method was employed to measure the content of $Li_3VO_4$ in the negative active material, and a laser diffraction method was employed to measure an average particle diameter thereof. The results are shown in FIG. 2A.

The X-ray diffraction analysis was performed at a scanning speed of 0.02°/sec in a range of 2θ of 10-80° by using X-rays of CuKa (1.5418 Å, 40 kV/30 mA). The data obtained by X-ray diffraction analysis was fitted by the Rietveld method to calculate the amount of $Li_3VO_4$, and when the amount of $Li_3VO_4$ was calculated, the Cerius2 program was used.

FIG. 2A is a graph showing the relationship of $Li_3VO_4$ content in the negative active material to an average particle diameter thereof. Referring to FIG. 2A, the vertical axis in the graph indicates average particle diameter (unit:μm), while the horizontal axis is $Li_3VO_4$ content (unit: wt %).

As shown in FIG. 2A, the higher the content of $Li_3VO_4$ included in the negative active material, the larger the average particle diameter of the negative active material.

Then, the negative active material according to Example 1 was evaluated regarding improvement of discharge capacity.

The discharge capacity evaluation was performed by using the same specimens as a negative electrode 4. In other words, a negative electrode was prepared by mixing 80 wt % of a negative active material including lithium vanadium oxide, 10 wt % of acetylene black, and 10 wt % of a binder, coating the mixture on a copper current collector, and then pressing to have a mass density of 1.8 g/cm³.

Then, a test cell of standard open-circuit potential was fabricated by disposing metal lithium at the negative electrode and a specimen at a positive electrode, and then measured regarding discharge capacity with a current density of 0.5 mA/cm². The results are shown in FIG. 2B.

In FIG. 2B, the vertical axis in the graph indicates discharge capacity (no unit), and the horizontal axis therein indicates $Li_3VO_4$ content (unit: wt %).

The discharge capacity was measured as a ratio calculated by adjusting discharge capacity to be 100, when $Li_3VO_4$ is included in an amount of 0 (hereinafter, referred to as Comparative Example 1). In addition, A1 in FIG. 2 indicates discharge capacity and B1 indicates average particle diameter.

As shown in FIG. 2B, the higher the content of $Li_3VO_4$ included in the negative active material, the more the discharge capacity was increased. However, when it was included in an amount of more than 3.0 wt %, it significantly decreased discharge capacity. The reason was the same as aforementioned.

Referring to FIGS. 2A and 2B, there are four examples of difference weight percentage of $Li_3VO_4$ included in the negative active material and the corresponding average particle diameter ranging:

Example 2

A negative active material including lithium vanadium oxide as a main component was prepared to include $Li_3VO_4$ in an amount of 0.5 to 3.0 wt %, and thereby to have an appropriate average particle diameter. When the negative active material was used for the negative electrode, it can improve discharge capacity by 30 to 40% compared with a non-aqueous rechargeable battery not including $Li_3VO_4$ in the negative active material. Herein, the negative active material had an average particle diameter ranging from 10 to 50 μm.

Example 3

The negative active material including lithium vanadium oxide as a main component was prepared to include $Li_3VO_4$ in an amount of 1 to 2 wt %, and thereby to have an appropriate average particle diameter. When the negative active material was used for the negative electrode, it can improve discharge capacity by 40% compared with a non-aqueous rechargeable battery not including $Li_3VO_4$ in the negative active material.

Example 4

The negative active material including lithium vanadium oxide as a main component was prepared to include $Li_3VO_4$ in an amount of 1 to 2 wt %, and thereby to have an appropriate average particle diameter. When the negative active material was used for the negative electrode, it can improve discharge capacity by 40% compared with a non-aqueous rechargeable battery not including $Li_3VO_4$ in the negative active material. Herein, the negative active material had an average particle diameter ranging from 20 to 33 μm.

Example 5

The negative active material including lithium vanadium oxide as a main component was prepared to include $Li_3VO_4$ in an amount of 0.5 to 2.3 wt %, and thereby to have an appropriate average particle diameter. When the negative active material was used for the negative electrode, it can improve discharge capacity by 40% compared with a non-aqueous rechargeable battery not including $Li_3VO_4$ in the negative active material. Herein, the negative active material had an average particle diameter ranging from 10 to 40 μm.

Example 6

A negative active material was prepared in the following method, and then measured regarding discharge capacity and discharge maintenance rate at a high rate depending on VC content therein. The results are shown in FIG. 3.

2-1) Preparation of a Negative Active Material

A negative active material was prepared not including $Li_3VO_4$, but having various amounts of VC.

Figure 3:
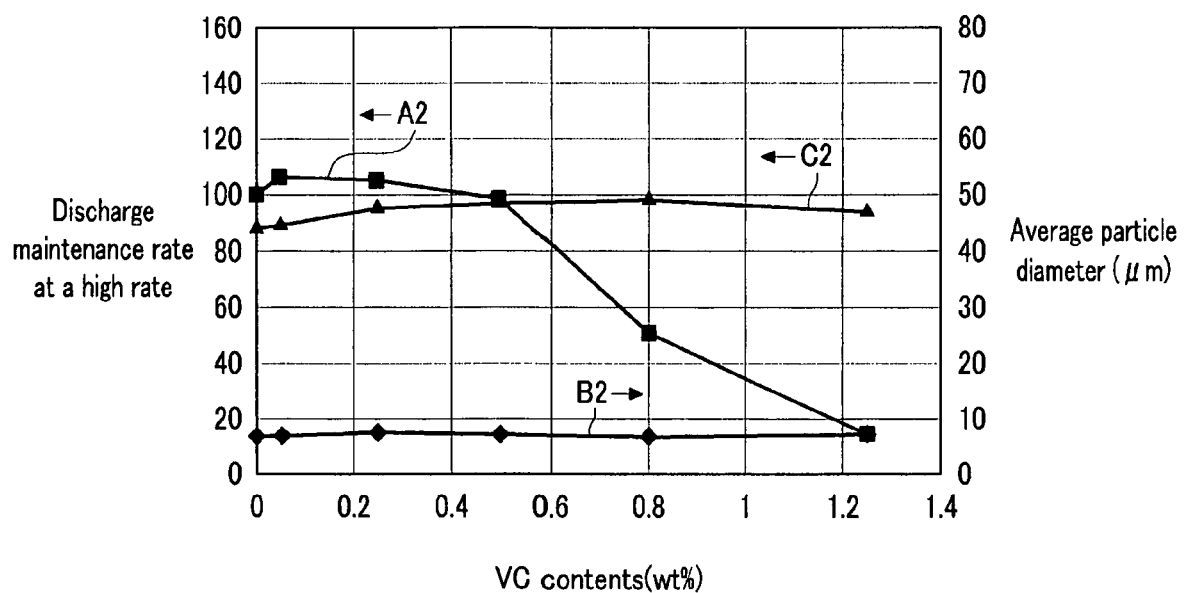
FIG. 3 is a graph showing vanadium carbide content of the negative active material in the negative active mass for a non-aqueous rechargeable battery according to Example 6, discharge capacity, and discharge capacity maintenance ratio at high rate.

First of all, LiOH (lithium hydroxide) and $V_2O_3$ (vanadium trioxide) were mixed in a mole ratio of 1.22:1 between lithium and vanadium, and then, VC was respectively added thereto in the various amounts shown in FIG. 3. The resulting products were fired at 1100° C. for 10 hours under a nitrogen atmosphere.

In addition, the negative active material was ground with a jet mill to have an average particle diameter of about 7 μm in order to remove influences of the average particle diameter.

2-2) Evaluation

The negative active material according to Example 6 was measured regarding VC content and average particle diameter in the same method as Example 1.

In addition, it was evaluated regarding discharge capacity and discharge maintenance rate at a high rate depending on VC content. The results are shown in FIG. 3.

Herein, a specimen and a test cell for measurement of discharge capacity and discharge maintenance rate at a high rate were formed according to the same method as in the negative active material of Example 1.

The discharge capacity was measured with 0.5 mA/cm$^2$ of a current density in the test cell, and then as a ratio calculated by adjusting discharge capacity to be 100 when VC content was included in an amount of 0 (hereinafter, referred to as Comparative Example 2).

In addition, the high-rate discharge maintenance rate was measured as a ratio of discharge capacity measured with a current density of 3 mA/cm$^2$ (hereinafter, referred to as a high rate discharge capacity), when discharge capacity measured with 0.5 mA/cm$^2$ of a current density in the test cell (hereinafter, referred to as low-rate discharge capacity) was adjusted to be 100.

FIG. 3 is a graph showing the relationship of VC content in the negative active material to discharge capacity, average particle diameter and high-rate discharge maintenance rate.

In FIG. 3, the horizontal axis in the graph indicates VC content (unit: wt %), while the vertical axes respectively indicate discharge capacity (no unit) and high-rate discharge maintenance rate (no unit). In addition, A2 is discharge capacity, B2 is average particle diameter of the negative active material (unit:μm), and C2 is high-rate discharge maintenance rate.

As shown in FIG. 3, the negative active material had high discharge capacity when it included VC in an amount of 0.5 wt % or less. On the contrary, it had sharply deteriorated discharge capacity when it included VC in an amount of 0.5 wt % or more. In addition, it had an improved high-rate discharge maintenance rate in proportion to the amount of VC. Since the VC has a low volume resistance rate as aforementioned, it can improve conductivity inside a particle when more VC is included.

Accordingly, since a negative active material including lithium vanadium oxide as a main component was prepared to include 0.5 wt % of VC, it can improve discharge capacity and high-rate discharge maintenance rate.

Example 7

LiOH (lithium hydroxide) and V$_2$O$_3$ (vanadium trioxide) were mixed in a mole ratio of 1.21:0.9 between lithium and vanadium. The resulting mixture was fired at 1100° C. under a nitrogen atmosphere for 10 hours to prepare a negative active material including LiVO$_2$ as a main component and 5 wt % of Li$_3$VO$_4$.

Example 8

LiOH (lithium hydroxide) and V$_2$O$_3$ (vanadium trioxide) were mixed in a mole ratio of 1.22:1 between lithium and vanadium, and Li$_3$VO$_4$ and VC were respectively added thereto in an amount of 1 wt % and 0.05 wt %. The resulting product was fired under a nitrogen atmosphere at 1100° C. for 10 to prepare a negative active material including LiVO$_2$ as a main component, 1 wt % of Li$_3$VO$_4$, and 0.05 wt % of VC.

According to the embodiment of the present invention, a negative active material can improve discharge capacity when it is applied to a non-aqueous rechargeable battery such as a lithium ion rechargeable battery and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a non-aqueous rechargeable battery, comprising:
   a main component of lithium vanadium oxide; and
   another component at least one selected from the group consisting of vanadium carbide, and a mixture of Li$_3$VO$_4$ and vanadium carbide, with the Li$_3$VO$_4$ being included in an amount of 0.01 to 5 wt % based on the total weight of the negative active material, and the vanadium carbide being included in amount of 0.5 wt % or less based on the total weight of the negative active material.

2. The negative active material of claim 1, wherein the vanadium carbide is included in an amount of 0.01 to 0.4 wt % based on the total weight of the negative active material.

3. The negative active material of claim 1, wherein the negative active material has an average particle diameter ranging from 5 to 50 μm.

4. A non-aqueous rechargeable battery comprising:
   a negative electrode comprising a negative active material with a main component of lithium vanadium oxide and another component at least one selected from vanadium carbide, and a mixture of Li$_3$VO$_4$ and vanadium carbide;
   a positive electrode; and
   an electrolyte,
   the Li$_3$VO$_4$ being included in an amount of 0.01 to 5 wt % based on the total weight of the negative active material, and the vanadium carbide being included in amount of 0.5 wt % or less based on the total weight of the negative active material.

5. The non-aqueous rechargeable battery of claim 4, wherein the vanadium carbide is included in an amount of 0.01 to 0.4 wt % based on the total weight of the negative active material.

6. The non-aqueous rechargeable battery of claim 4, wherein the negative active material has an average particle diameter ranging from 5 to 50 μm.

* * * * *